United States Patent [19]

Winterer

[11] Patent Number: 4,668,859
[45] Date of Patent: May 26, 1987

[54] PROTECTIVE ZONE DEVICE FOR A VEHICLE

[75] Inventor: Hermann Winterer, Freiburg, Fed. Rep. of Germany

[73] Assignee: Erwin Sick GmbH Optik-Elektronik, Waldkirch, Fed. Rep. of Germany

[21] Appl. No.: 742,167

[22] Filed: Jun. 6, 1985

[30] Foreign Application Priority Data

Jun. 26, 1984 [DE] Fed. Rep. of Germany ....... 3423536

[51] Int. Cl.$^4$ .......................... G01V 9/04; B60T 7/16; B62D 1/24
[52] U.S. Cl. ................................ 250/221; 250/222.1; 180/169
[58] Field of Search ...................... 250/221, 222.1, 234, 250/235, 236; 180/167, 169; 340/555, 556, 557; 356/1

[56] References Cited

U.S. PATENT DOCUMENTS 3,749,197  7/1973  Deutsch ............................. 180/169
4,558,215  12/1985  Kaneko et al. ................... 250/222.1

FOREIGN PATENT DOCUMENTS 0005696  12/1979  European Pat. Off. ............ 180/167

Primary Examiner—David C. Nelms
Assistant Examiner—S. Allen
Attorney, Agent, or Firm—Townsend and Townsend

[57] ABSTRACT

A protective zone apparatus on a vehicle capable of travelling along a path has a light transmitter (16) and a light receiver (18). The transmitted light beam (11) is obliquely directed onto the path of travel (12) at a first fixed angle ($\alpha$) and executes a scanning movement about an axis (13) perpendicular to the path of travel (12). The received light beam extends at a second fixed angle ($\beta$) from the point of impingement (15) of the transmitted light beam (11) on the path of travel (12) to the perpendicular axis (13) and executes a scanning movement synchronous with that of the transmitted light beam (11). An electronic processing circuit transmits a control signal which stops the vehicle if an obstacle arises in the protective zone (FIG. 1).

22 Claims, 4 Drawing Figures

PROTECTIVE ZONE DEVICE FOR A VEHICLE

BACKGROUND OF THE INVENTION

The invention relates to a protective zone apparatus on a vehicle capable of travelling along a path, the apparatus comprising a light transmitter which transmits a light beam into a protective zone located at the vehicle, and a light receiver which receives a light beam from the protective zone and is connected to an electronic processing circuit, wherein the electronic processing circuit transmits a control signal which stops the vehicle on the entry of an obstacle into the protective zone.

DESCRIPTION OF THE RELATED ART

Such protective zone devices are necessary with driverless remotely controlled vehicles in order to stop the power transmission or the movement of the vehicle immediately when dangers suddenly arise, such as the dangers which can be caused by obstacles or persons standing in the path of travel. For this purpose one had previously provided either protective zones secured by light barriers alongside or in front of the vehicle, or arranged switching strips on the vehicle which initiate a vehicle stopping signal on contact with an obstacle.

However, timely initiation of a vehicle stopping signal cannot be realised with either the switching strip or the light barrier safety system. This can in particular be attributed to the fact that the protective zones formed by the known arrangements lie too close to the outer periphery of the vehicle.

SUMMARY OF THE INVENTION

The invention is based on the problem of providing a protective zone apparatus of the initially named kind by means of which the protective zone around the vehicle, and in particular in the region of the corners, can have a sufficient extent in the direction away from the vehicle that the presence of the obstacle can be timely signalled prior to the arrival of the vehicle.

In order to solve this problem the invention provides that the transmitted light beam is directed at a first fixed angle obliquely onto the path of travel from above and executes a scanning movement about an axis perpendicular to the path of travel; and that the received light beam extends from the point of impingement of the transmitted light beam onto the path of travel to the vertical axis at a second fixed angle, which is different from said first fixed angle, and executes a scanning movement synchronous to that of the transmitted light beam.

The invention thus provides a homogeneous light curtain in the form of a cone of light around the regions of the vehicle which are to be protected, so that it is possible not only to recognize all the obstacles which are present on the path of travel, as a result of their difference in height relative to the path of travel, but also to reliably detect and registered encroachments behind the protective zone, for example due to movement through the protective zone.

Switching strips can also be provided on the vehicle in addition to the protective zone apparatus of the invention whereby optimum safety can be realised.

It is of particular significance for the invention that the scanning distance of the transmitted and received light beam which is guided in a circular arc around the axis perpendicular to the direction of travel is always of the same size at each instant of the scanning movement, i.e. that the distance-wise association of the path of travel, which is irradiated pointwise (reflection plane), to the light receivers remains constant over the entire path of the scanning beam.

As a result of the arrangement of the invention it is even possible to display bumps or depressions in the ground or floor which are dangerous to the vehicle. Furthermore, it is possible as a result of the cone-like light curtain to recognize both large obstacles, such as people, in exactly the same way as small obstacles, for example, domestic animals.

With regard to the first fixed angle the invention expediently provides that this angle amounts to from 30° to 70°, preferably from 40° to 60°, and in particular to approximately 45°.

The second fixed angle should be smaller than the first fixed angle with the angle between the transmitted light beam and the received light beam amounting preferably to 5° to 15° and in particular to approximately 10°.

A particularly preferred constructional realization of the invention is constructed so that the optical axis of the fixedly arranged light transmitter coincides with the axis which is directed perpendicular to the path of travel and so that its output light beam impinges on a deflection mirror which is rotatable about the vertical axis and which forms the transmitted light beam. In this case it is expediently further provided that the optical axis of the fixedly arranged light receiver coincides with the axis which is directed perpendicular to the path of travel; and that its entry light beam is reflected by a deflection mirror which is rotatable about the axis which is directed perpendicular to the path of travel, whereby the received light beam is deflected to the light receiver.

In order to ensure the required synchronous drive of the two deflection mirrors the deflection mirror for the transmitted beam and the deflection mirror for the received beam are usefully driven to execute a rotary movement by one and the same motor.

A first possibility of arranging the protective zone apparatus lies in arranging it at the front of the vehicle in the middle, with the protective zone extending around the front side of the vehicle. It is however also possible that a respective protective zone apparatus is arranged in the vicinity of each front corner of the vehicle and that the two protective zones extend around the respective front corners of the vehicle.

The light transmitter and the light receiver are expediently accommodated in a common housing.

The invention makes it possible for all encroachments which affect the scanning distance (for example, obstacles on the path of travel) to be registered via the light receiver and to be processed in the subsequent electronic processing circuit in order to initiate the control signal which stops the vehicle.

In order to exploit a failure of the protective zone apparatus for the display of or for triggering a vehicle stopping signal the electronic processing circuit which follows the light receiver should operate in accordance with the passive current principle. In other words the light receiver will receive light when the path of travel is free which leads to a passive current in the electronic processing circuit. This passive current is reduced or disappears entirely both on failure of the protective zone device and also when an obstacle arises.

It is particularly expedient if the visible region (circular arc of the transmitted light beam) which is specifically required for each specific application can be continuously adjusted or restricted. As the deflecting mirrors or other mechanical elements which produce the scanning movement a preferably rotate continuously the restriction of the scanning region is expediently effected by electronically blanking out the zones which are not to be monitored.

BRIEF DESCRIPTION OF THE DRAWING

The invention will now be described by way of example only and with reference to the accompanying drawings which show.

DESCRIPTION OF THE PREFERRED EEMBODIMENTS

Figure 2:
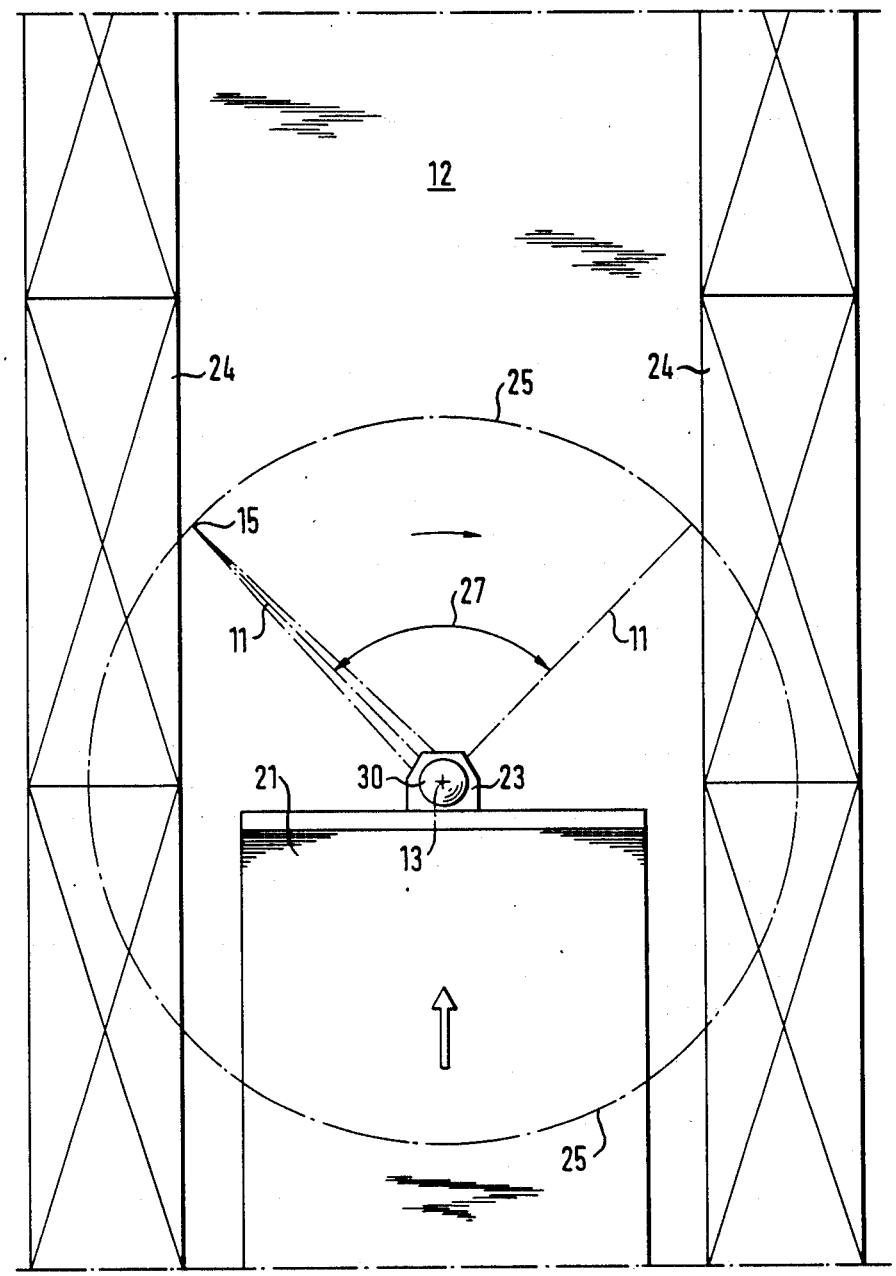

As seen in FIG. 2 the housing 23 containing the optical/electrical protective zone apparatus of the invention is secured to the front wall of a vehicle moving along a flat route or path of travel 12. Shelves or racks 24 are erected alongside the path of travel 12 which is formed as a corridor.

Figure 1:
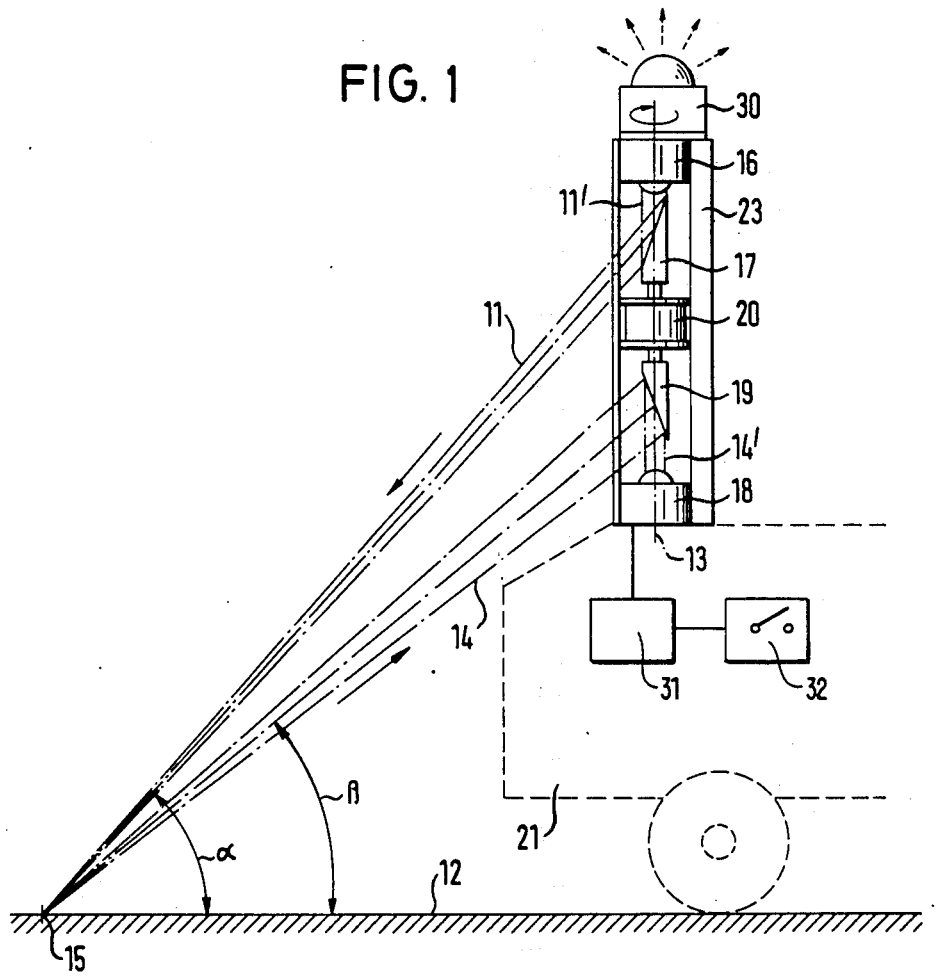
FIG. 1 a schematic side view of the front region of a vehicle equipped with the protective zone apparatus of the invention, FIG. 2 a plan view of the vehicle of FIG. 1 in which it is assumed that the vehicle is moving in a passage located between two rows of shelving, FIG. 3 a schematic plan view of a path of travel adhered to by three vehicles on one route, and FIG. 4 a plan view of a vehicle equipped with two pieces of protective zone apparatus.

As seen in FIG. 1 a light receiver 18, a deflection mirror 19 which is rotatable about a vertical axis 13, an electric motor 20, a deflection mirror 17 which is rotatable about the same vertical axis 13, and a light transmitter 16 are arranged vertically above one another in the housing 23. The optical axis of the light transmitter 16 and of the light receiver 18 coincide with the vertical axis 13 about which the deflecting mirrors 17, 19 and the motor 20 are rotatable.

The light beam 11' which emerges along the optical axis of the light transmitter 16 is reflected obliquely downwardly at the deflection mirror 17 as the transmitted light beam 11 in such a way that the transmitted light beam 11 includes a fixed angle $\alpha$ of approximately 45° with the path of travel 12. The point of impingement 15 of the transmitted light beam 11 lies substantially in front of the front edge of the vehicle 21. The distance of the point of impingement 15 from the vehicle can be adjusted to a desired value by suitable choice of the angle $\alpha$ and/or the height or vertical position of the housing 23.

When the motor 20 which jointly drives the deflection mirror 17 and the deflection mirror 19 is switched on the transmitted light beam 11 executes a circular movement around a conical surface and the point of impingement 15 describes the circle 25 in accordance with the FIG. 2.

The electronic processing circuit, operatively connected to the light receiver 18, however blanks out some of the circular arc 25, apart from the sector 27 which is so selected that the point of impingement 15 of the transmitted light beam 11 cannot reach the area of the shelving 24, unless the vehicle 21 deviates from its desired path. From the point of impingement 15 a part of the reflected light is reflected back as the received light beam 14 to the deflection mirror 19 which is synchronously driven with the deflection mirror 17 for the transmitted light beam by means of the motor 20. The inclination of the plane deflection mirror 19 is so selected that the received light beam 14, which includes a smaller angle $\beta$ with the path of travel 12 than does the transmitted light beam 11, enters into the light receiver 18 as a light beam 14' which is aligned with the optical axis or the vertical axis 13. The light receiver 18 is connected to the electronic processing circuit 31 which controls a switching device 32 in such a manner that it stops the vehicle when the transmitted light beam 11 does impinge on an obstacle. If no light is received by the light receiver 18 because an obstacle is interrupting the beams 11, 14 the electronic processing circuit 31 transfers a switching signal to the switching device 32 which controls the motor of the vehicle 21.

In each angular position of the deflecting mirror 17,19 the optical scanning relationships are completely the same, as a result of the circular cone arrangement, so that the sensitivity of the protective zone apparatus is the same throughout the protective zone.

Figure 3:
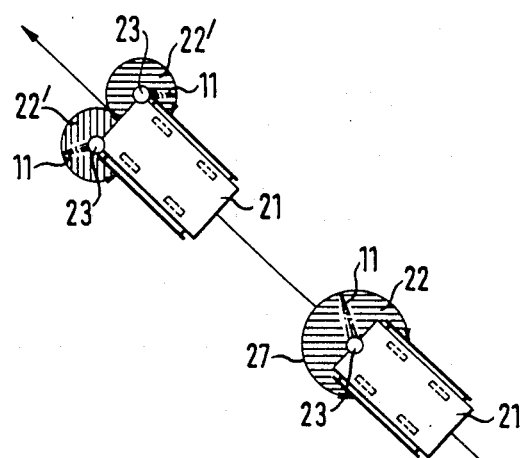
Figure 3:
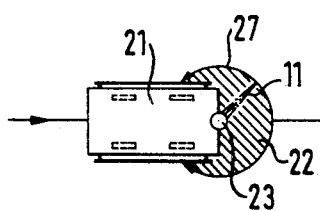

FIG. 3 shows two vehicles with a protective zone apparatus in accordance with the invention arranged at the middle of each of the vehicles 21, only the housing 23 and the transmitted light beam 11 are schematically illustrated in each case. The circular protective zone 22 defined by the protective zone apparatus of the invention is schematically illustrated in FIG. 3. The inoperative monitoring sector 27, which is provided by a blanking out process by means of the processing electronics, extends laterally beyond the front corners of the vehicle 21.

Figure 4:
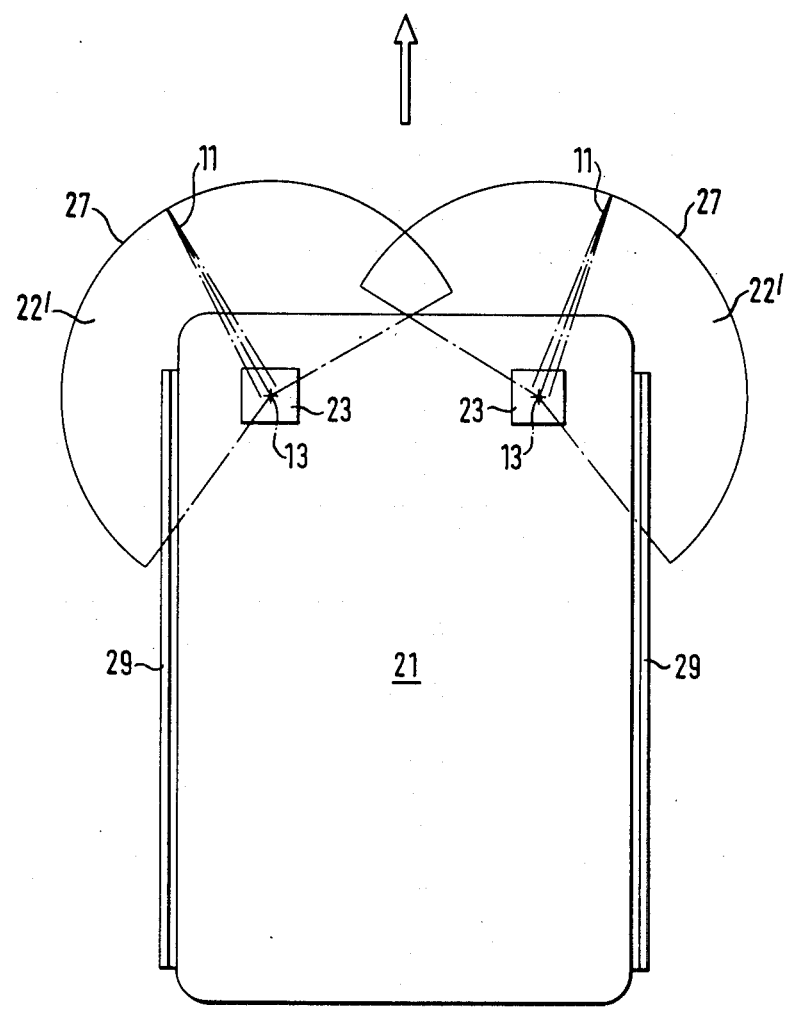

FIGS. 3 and 4 also show a vehicle 21 in which two pieces of protective zone apparatus, each having a housing 23, are arranged in the vicinity of the front corners. Each protective zone apparatus defines a protective zone 22' which extends symmetrically about a respective one of the front corners of the vehicle 21. In this way the response of the protective zone apparatus to obstacles which occur in the corner regions is optimized.

In addition a switching strip 29 can in each case be provided at the sides of the vehicle 21 so that a stop signal can also be generated via the electronic processing circuit on lateral bumping contact with the vehicle 21.

A rotating and blinking warning lamp 30 can also be arranged on the housing 23 and is set into operation if an obstacle is detected, so that the vehicle which has been stopped can easily be found.

The speed of the motor 20 and of the deflecting mirrors 17, 19 can for example amount to 1200 r.p.m.

The distance of the point of impingement 15 from the vertical axis 13 should for example amount to 1 m.

I claim:

1. Apparatus for forming a protective zone immediately forward of a vehicle travelling along a path, the apparatus comprising a light transmitter for directing a light beam into the protective zone, a light receiver for detecting light from the beam reflected from the protective zone, an electronic processing circuit operatively coupled with the light receiver for generating a control signal for stopping the vehicle when a change in the reflected light is detected by the light receiver the light transmitter including means for directing the light beam at a first fixed angle obliquely onto the path of travel from above, means for scanning the light beam from the transmitter about an axis perpendicular to the path of travel the receiver being positioned so that light reflected by the plane of the zone and detected by the receiver is at a second fixed angle which is different from said first fixed angle and means for scanning the light beam from the receiver synchronously with the light beam from the transmitter.

2. Apparatus in accordance with claim 1, wherein the first fixed angle is in the range of from about 30° to 70°.

3. Apparatus in accordance with claim 1, wherein the second fixed angle is smaller than the first fixed angle.

4. Apparatus in accordance with claim 3, wherein the second fixed angle is smaller than the first fixed angle by 5° to 15°.

5. Apparatus in accordance with claim 1, wherein the light transmitter includes a light source directing light along a vertical axis substantially perpendicular to the travel path, a first mirror receiving light from the source and deflecting it into the zone, and means for concentrically pivoting the first mirror about the vertical axis.

6. Apparatus in accordance with claim 5, wherein the light receiver includes a light detector coaxially arranged with the light source in the vertical axis, a second mirror which is movable about the vertical axis and positioned to deflect the detected light from the protective zone to the detector, and means for moving the second mirror concentrically about the vertical axis.

7. Apparatus in accordance with claim 6, including a motor operatively coupled to the first and second mirrors for rotatably moving mirrors about the vertical axis.

8. Apparatus in accordance with claim 1, wherein the transmitter and the receiver are positioned at a front end of the vehicle and at about a center thereof so that the protective zone extends about the front end of the vehicle.

9. Apparatus in accordance with claim 1, wherein the transmitter and the receiver are positioned at proximate lateral corners at a front end of the vehicle so that the protective zone extends about each corner of the vehicle.

10. Apparatus in accordance with claim 1, including a common housing for the light transmitter and the light receiver.

11. Apparatus in accordance with claim 1, wherein all encroachments which affect the scanning distance are registered by the light receiver and processed in the electronic processing circuit to initiate the control signal which stops the vehicle.

12. Apparatus in accordance with claim 1, wherein the electronic processing circuit operatively connected to the light receiver operates in accordance with a passive current principle.

13. Apparatus in accordance with claim 1, wherein the scanning can be continuously adjusted and bounded.

14. Apparatus for attachment adapted to travel over a surface to a vehicle to establish a protective zone in an area adjacent the vehicle within which protective zone the detection of an object causes the vehicle to stop, the apparatus comprising:

a light transmitter for generating a light beam, the light transmitter being disposed on an axis which is perpendicular to the direction of travel of the vehicle;

a light detector, disposed on said axis, for detecting a reflected light beam;

a first deflection mirror, disposed on said axis, for directing the light beam from the light transmitter obliquely onto the surface in the protective zone at a first fixed angle defined by the light beam and the surface plane of the protective zone;

a second deflection mirror for directing onto the light receiver, light from the beam reflected by the surface at a second fixed angle relative to the surface which is different from the first fixed angle;

motor means, disposed on said axis, for rotating the first and second deflection mirrors about said axis so that the transmitted beam and the detected beam rotate synchronously about said axis, thereby producing a scan zone composed of the transmitted and detected light beams;

electronic processing circuit means operatively connected to the light receiver for processing signals therefrom, the processing circuit being operative according to a passive current principle such that when a light beam is detected by the light receiver no control signal is emitted by the processing circuit, and the processing circuit being further operative to blank out part of the scan zone so that the detection of an object in the blanked-out part of the scan zone will not cause the vehicle to stop, and the processing circuit being further operative so that an arc segment of the scan zone is continuously adjustable by said blanking circuit to establish protective zones of different extents;

an electronic switching device operatively connected to said electronic processing circuit for transmitting a control signal to the vehicle such that when no light beam is detected by the light receiver, the processing circuit emits a control signal to the switching device to cause the vehicle to stop; and means for housing the light transmitter, the light receiver, the deflection mirrors, and the motor means.

15. Apparatus as in claim 14 wherein the first fixed angle is in the range from about 30° to 70°.

16. Apparatus as in claim 15 wherein the first fixed angle is in the range from about 40° to 60°.

17. Apparatus as in claim 16 wherein the first fixed angle is approximately 45°.

18. Apparatus as in claim 14 wherein the second fixed angle is smaller than the first fixed angle.

19. Apparatus as in claim 18 wherein the second fixed angle is smaller than the first fixed angle by 5° to 15°.

20. Apparatus as in claim 19 wherein the second fixed angle is smaller than the first fixed angle by approximately 10°.

21. Apparatus as in claim 14 wherein the apparatus is disposed proximately at the center of the front end of the vehicle so that the protective zone extends around the front end of the vehicle.

22. Apparatus as in claim 14 wherein a first apparatus is disposed proximately to one front corner of the vehicle and a second apparatus is disposed proximately to another front corner of the vehicle such that a protective zone extends around each front corner of the vehicle.

* * * * *